US012762165B2

(12) United States Patent
Zhang et al.

(10) Patent No.: US 12,762,165 B2
(45) **Date of Patent: *Oct. 13, 2026**

(54) UTILIZING A LARGE LANGUAGE MODEL TO PERFORM A QUERY

(71) Applicant: Tiny Fish Inc., Cupertino, CA (US)

(72) Inventors: Shuhao Zhang, Cupertino, CA (US); Qi Zhai, Hillsborough, CA (US); Mingyang Li, Bellevue, WA (US)

(73) Assignee: Tiny Fish Inc., Cupertino, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 18/652,615

(22) Filed: May 1, 2024

(65) Prior Publication Data

US 2025/0077558 A1 Mar. 6, 2025

Related U.S. Application Data

(63) Continuation of application No. 18/243,024, filed on Sep. 6, 2023, now Pat. No. 12,019,663.

(51) Int. Cl.

| | |
|---|---|
| ***G06F 40/30*** | (2020.01) |
| ***G06F 16/332*** | (2019.01) |
| ***G06F 16/334*** | (2025.01) |
| ***G06F 16/34*** | (2019.01) |
| ***G06F 16/35*** | (2019.01) |
| ***G06F 40/205*** | (2020.01) |
| ***G06F 40/279*** | (2020.01) |

(52) U.S. Cl.

CPC ...... *G06F 16/3344* (2019.01); *G06F 16/3325* (2019.01); *G06F 16/345* (2019.01); *G06F 16/35* (2019.01); *G06F 40/205* (2020.01); *G06F 40/279* (2020.01); *G06F 40/30* (2020.01)

(58) Field of Classification Search

CPC .... G06F 40/211; G06F 40/253; G06F 40/268; G06F 40/284; G06F 40/30

See application file for complete search history.

(56) References Cited

U.S. PATENT DOCUMENTS

| | | | | |
|---|---|---|---|---|
| 7,899,871 | B1 * | 3/2011 | Kumar | G06Q 10/107 709/206 |
| 8,412,698 | B1 * | 4/2013 | Sarukkai | G06F 16/9535 707/706 |
| 10,191,951 | B1 * | 1/2019 | Bronstein | G06F 16/24578 |
| 12,505,302 | B2 * | 12/2025 | Sundaram | G06F 40/279 |
| 12,639,529 | B2 * | 5/2026 | Yuan | G06F 40/40 |
| 2004/0088308 | A1 * | 5/2004 | Bailey | G06F 16/355 |
| 2007/0136276 | A1 * | 6/2007 | Vella | G06F 16/9535 707/999.005 |

(Continued)

*Primary Examiner* — Lamont M Spooner

(74) *Attorney, Agent, or Firm* — Van Pelt, Yi & James LLP

(57) ABSTRACT

A query is received from a client device. A large language model is prompted to generate a plurality of subtopics on the query and to generate a corresponding plurality of keywords for each of the plurality of subtopics. One or more search engines are utilized to perform a plurality of searches utilizing the plurality of subtopics and the corresponding plurality of keywords received from the large language model. A plurality of responses corresponding to the plurality of subtopics and the corresponding plurality of keywords is received from the one or more search engines. The plurality of responses is evaluated based on the corresponding plurality of keywords.

23 Claims, 5 Drawing Sheets

(56) References Cited

U.S. PATENT DOCUMENTS

2007/0162272 A1* 7/2007 Koshinaka .............. G06F 16/35 707/E17.089
2009/0030682 A1* 1/2009 VanSickle ............. G06F 16/958 704/235
2009/0177463 A1* 7/2009 Gallagher ............. G06F 16/313 704/10
2010/0114933 A1* 5/2010 Murdock ................ G06F 16/58 707/765
2011/0040767 A1* 2/2011 Kunjithapatham ... G06F 16/367 707/E17.109
2011/0119243 A1* 5/2011 Diamond ............ G06F 16/9535 707/706
2013/0081056 A1* 3/2013 Hu .......................... G06F 16/35 719/313
2013/0346401 A1* 12/2013 Karidi ................... G06F 16/951 707/723
2014/0280174 A1* 9/2014 Bitan .................... G06F 16/904 707/740
2015/0058320 A1* 2/2015 Zheng ..................... G06F 16/35 707/722
2015/0112918 A1* 4/2015 Zheng .................... G06N 5/047 706/48
2015/0169576 A1* 6/2015 Panda ................. G06F 16/3326 707/723
2015/0193535 A1* 7/2015 Balmin .............. G06Q 30/0201 707/706
2015/0254565 A1* 9/2015 Beigman Klebanov ..................... G06N 7/01 706/55
2016/0125087 A1* 5/2016 Mallah .............. G06F 16/24575 705/14.54
2016/0147893 A1* 5/2016 Mashiach ........... G06F 16/9535 707/710
2017/0032274 A1* 2/2017 Yu ......................... G06F 21/316
2017/0060997 A1* 3/2017 Lee ....................... G06F 16/355
2017/0124184 A1* 5/2017 Podgorny .............. G06N 20/00
2017/0140117 A1* 5/2017 Haddad ............... G06F 16/2423
2018/0005248 A1* 1/2018 Koutrika ............ G06Q 30/0631
2018/0089197 A1* 3/2018 Barron .............. G06F 16/24522
2018/0144054 A1* 5/2018 Ramanathan ......... G06F 16/355
2018/0225365 A1* 8/2018 Altaf ..................... G06F 16/334
2018/0268022 A1* 9/2018 Rose ..................... G06F 16/242
2019/0213407 A1* 7/2019 Toivanen ................ G06F 40/56
2020/0125594 A1* 4/2020 Sekine ................ G06F 16/3323
2020/0159801 A1* 5/2020 Sekine ................ G06F 16/4393
2020/0293618 A1* 9/2020 Chhabra ................ G06Q 10/10
2020/0356633 A1* 11/2020 Garlapati .............. G06F 16/287
2020/0379838 A1* 12/2020 Valdes Esquivel ..... G06F 40/30
2020/0394244 A1* 12/2020 Friedman ................ H04L 51/10
2020/0401663 A1* 12/2020 Goldbraich ............. G06F 16/35
2021/0141822 A1* 5/2021 McLeod ............... G06F 16/353
2021/0264116 A1* 8/2021 Thor ....................... G06F 40/20
2021/0397639 A1* 12/2021 Jacob .................... G06F 16/355
2023/0111911 A1* 4/2023 Druck .................... G06Q 10/10 715/234
2023/0126266 A1* 4/2023 Kimber ................... G06F 40/30 706/12
2024/0037126 A1* 2/2024 Allouche .............. G06F 16/313
2025/0190466 A1* 6/2025 Barros ................ G06F 16/3325

* cited by examiner

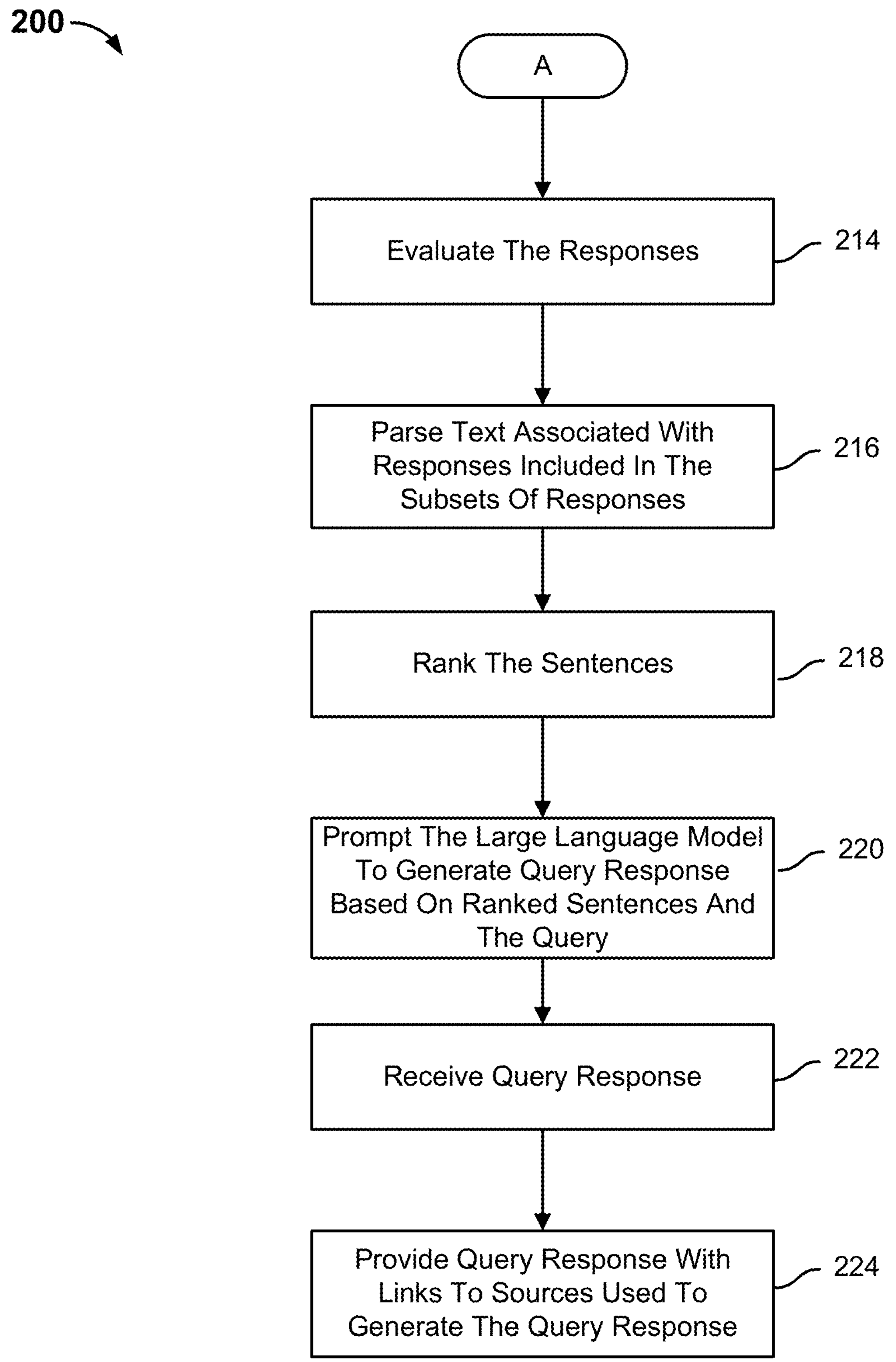
FIG. 2 con'd

UTILIZING A LARGE LANGUAGE MODEL TO PERFORM A QUERY

CROSS REFERENCE TO OTHER APPLICATIONS

This application is a continuation of U.S. patent application Ser. No. 18/243,024 entitled UTILIZING A LARGE LANGUAGE MODEL TO PERFORM A QUERY filed Sep. 6, 2023 which is incorporated herein by reference for all purposes.

BACKGROUND OF THE INVENTION

A large language model (LLM) is a trained deep-learning model that understands and generates text in a human-like fashion. The LLM may receive a query from a client device and generate a response to the query. The LLM acts like a black box when generating the query response. A user viewing the response on the client device may accept the information included in the response as being accurate, however, the user does not have a mechanism to verify the accuracy of the response. That is, there is no way to determine if the information provided in the response is accurate.

BRIEF DESCRIPTION OF THE DRAWINGS

Various embodiments of the invention are disclosed in the following detailed description and the accompanying drawings.

DETAILED DESCRIPTION

Figure 1:
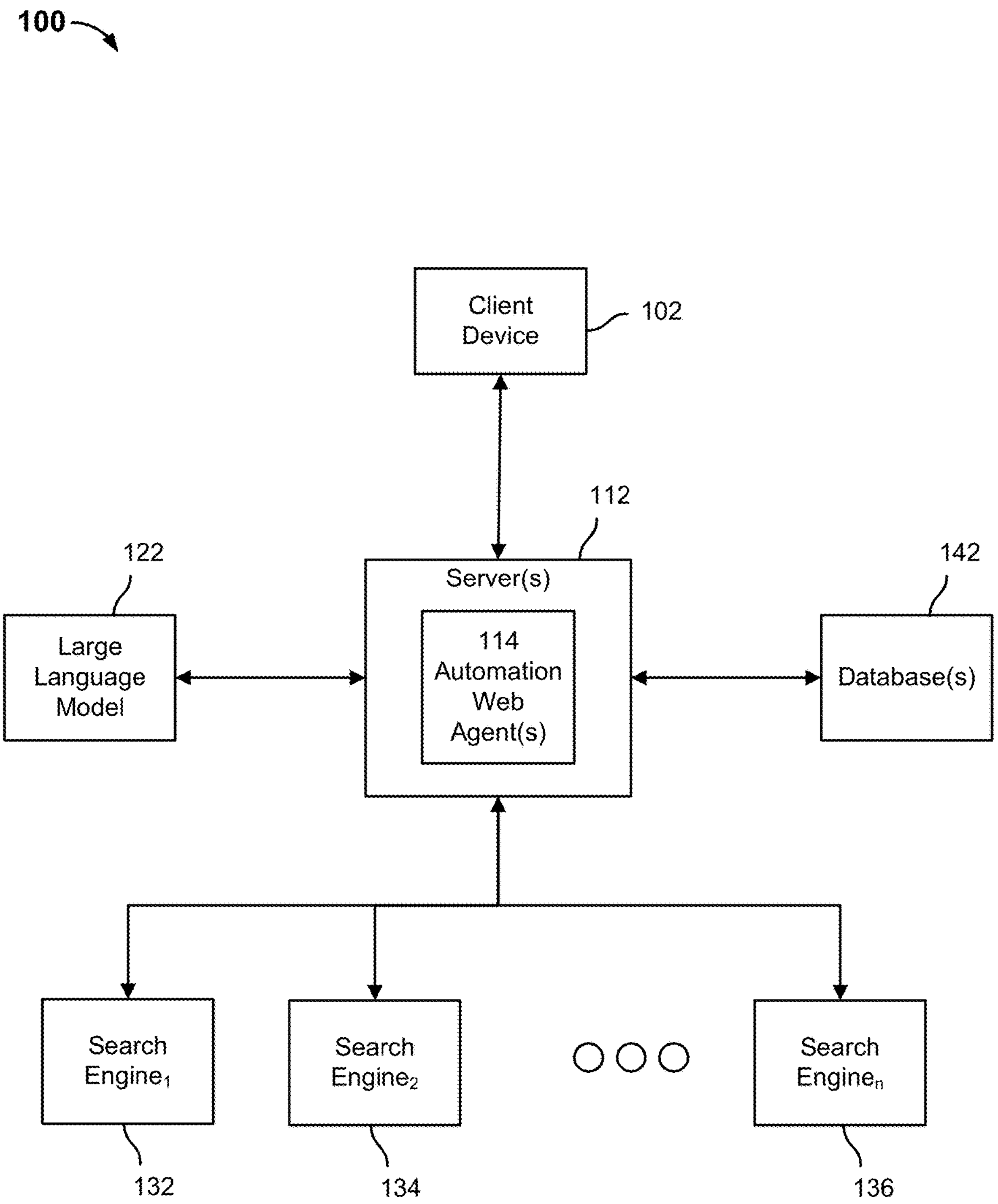
FIG. 1 is a block diagram illustrating a system for utilizing a LLM to perform a query in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to enable a user to verify the accuracy of a query response provided by an LLM is disclosed. The technique includes receiving a query comprised of one or more words from a client device. In some embodiments, the query includes a plurality of words and the words included in the query are rephrased to present the query in an improved format for an LLM prompt. A prompt is generated for an LLM. The prompt includes a request for the LLM to generate a plurality of subtopics related to the query and a corresponding plurality of keywords for each of the plurality of subtopics. For example, the prompt may include a request for the LLM to generate 3 different subtopics related to the query and 15 keywords for each of the 3 different subtopics. The prompt may be modified by the user via the client device before being sent to the LLM. For example, the user may modify the prompt to generate 4 different subtopics related to the query instead of 3 different subtopics.

The prompt is sent to the LLM and in response to receiving the prompt, the LLM provides a response. The LLM response includes the plurality of subtopics related to the query and the corresponding plurality of keywords for each of the plurality of subtopics.

One or more search engines are utilized to perform a plurality of searches, in parallel, utilizing the plurality of subtopics and the corresponding plurality of keywords received from the LLM. A plurality of search engine responses corresponding to the plurality of subtopics and the corresponding plurality of keywords is received from the one or more search engines. The plurality of search engine responses is evaluated based on the corresponding plurality of keywords. A search engine response, such as a search result snippet or a search result preview, is evaluated and ranked by counting a frequency at which (e.g., a number of times) a keyword included in the corresponding plurality of keywords appears in the search result snippet or the search result preview. A ranking associated with a search engine response may be boosted based on a domain associated with a response. The plurality of search engine responses is filtered to generate a corresponding subset of search engine responses for each of the subtopics based on the number of times keywords are included in a search engine response.

For each of the subtopics, the body of a page associated with a search engine response included in the corresponding subset of search engine responses associated with the subtopic (e.g., the page linked to a search result snippet), is parsed to identify sentences included in the page associated with the search engine response. The identified sentences are analyzed and ranked based on the frequency at which (e.g., number of times) keywords generated by the LLM that are associated with the subtopic are included in an identified sentence.

Each subtopic is associated with a threshold limit of words (e.g., 600 words). A top number (e.g., 10) or a top percentage (e.g., top 10%) of sentences associated with a subtopic are identified. A plurality of sentences associated with a subtopic is selected such that the word limit is not exceeded. A lower ranked sentence associated with a subtopic (e.g., #10) may be selected if a total number of words associated with the higher ranked sentences associated with the subtopic (e.g., sentences #1-9) is less than the threshold limit of words and selecting the lower ranked sentence associated with the subtopic would cause the word limit associated with the subtopic to be exceeded.

A query response prompt is generated based on the received query and the sentences selected for each subtopic. For example, the query response prompt may request the LLM to generate a query response based on the received query, the top 10 sentences for a first subtopic, the top 10 sentences for a second subtopic, and the top 10 sentences for a third subtopic. The query response prompt is provided to the LLM and a query response is received from the LLM. The query response is provided to the client device. The query response identifies and includes links to the sources associated with the selected sentences (e.g., a page linked to a search result snippet), that is, the query response identifies and includes links to the sources that were used by the LLM to generate the query response. As a result, a user associated with the client device may determine if the information provided in the response is accurate by clicking the links to the sources and reviewing the information included in a source.

FIG. 1 is a block diagram illustrating a system for utilizing a LLM to perform a query in accordance with some embodiments. System 100 includes a client device 102 configured to communicate with a server 112. Client device 102 may be a computer, laptop, smartphone, tablet, desktop, server, or any other type of computing device that is capable of communicating with a server. Client device 102 may communicate with server 112 using wireless or wired communications.

Server 112 may be an on-prem server, a cloud server running in a cloud environment, a cluster, a virtual server, a virtual machine, or other type of server. In some embodiments, server 112 is comprised of a plurality of servers. In some embodiments, one or more servers 112 include a plurality of containerized applications that are configured to utilize LLM 122 to provide the query response. Server 112 is configured to communicate with LLM 122 using wireless or wired communications. In some embodiments, server 112 includes LLM 122.

Server 112 is configured to receive a query from client device 102. In response to receiving the query, server 112 is configured to generate a prompt for LLM 122 (e.g., GPT-3, GPT-3, LLAMA, PaLM2). The prompt includes a request for LLM 122 to generate a plurality of subtopics related to the query and a corresponding plurality of keywords for each of the plurality of subtopics. For example, the prompt may include a request for LLM 122 to generate 3 different subtopics related to the query and 15 keywords for each of the 3 different subtopics. The prompt may be modified by the user via client device 102 before being provided to LLM 122.

Server 112 is configured to provide the prompt to LLM 122. In response, LLM 122 is configured to generate a response and provide the response to server 112. The response from LLM 122 includes the plurality of subtopics related to the query and a corresponding plurality of keywords for each of the plurality of subtopics.

Server 112 is configured to utilize one or more search engines 132, 134, . . . , 136 to perform a plurality of searches, in parallel, utilizing the plurality of subtopics and the corresponding plurality of keywords received from LLM 122. In some embodiments, the plurality of searches are performed sequentially. Although FIG. 1 depicts three different search engines, server 112 may utilize 1: n search engines to perform the plurality of searches.

A plurality of search engine responses corresponding to the plurality of subtopics and the corresponding plurality of keywords is received from the one or more search engines 132, 134, . . . , 136. Server 112 is configured to evaluate the plurality of search engine responses (e.g., a search result snippet, a search result preview) based on the corresponding plurality of keywords received from LLM 122. For example, a search result snippet or a search result preview is evaluated by counting a number of times (i.e., the frequency) a keyword included in the corresponding plurality of keywords appears in the search engine result. The plurality of search engine responses is filtered to generate a corresponding subset of search engine responses for each of the subtopics based on the number of times keywords are included in a search engine response.

For each of the subtopics, the body of a page associated with a search engine response (e.g., the webpage linked to the search engine response) included in the corresponding subset of search engine responses associated with the subtopic, is parsed to identify sentences included in the body of the page associated with the search engine response. Each identified sentence is associated with a corresponding subtopic. Server 112 is configured to analyze and rank the identified sentences based on the number of times (i.e., the frequency) keywords generated by LLM 122 that are associated with the corresponding subtopic are included in an identified sentence.

Server 112 includes one or more automation web agents 114. A web page may include information that is not search engine indexed (e.g., product pricing, user reviews, historical weather data, DMV registration record, etc.). An automation web agent 114 may be used to emulate human operations on a web page and extract information on the web page that is related to the query. The automation web agent 114 may transform the extracted information into a user desired output format.

Server 112 is configured to parse the extracted information to identify sentences included in the extracted information. Server 112 is configured to analyze and rank the identified sentences based on the number of times keywords generated by LLM 122 that are associated with the subtopic are included in an identified sentence.

In some embodiments, login credentials may need to be provided before access to a web page is given. A user associated with client device 102 may provide their login credentials associated with one or more web pages (e.g., Wall Street Journal, IEEE, Bloomberg Law, etc.) prior to performing a query. Responsive to receiving a query, an automation web agent 114 may utilize the login credentials associated with one or more web pages to access the one or more web pages and extract information from the one or more web pages that is related to the query. Server 112 is configured to parse the extracted information to identify sentences included in the extracted information. Server 112 is configured to analyze and rank the identified sentences based on the number of times keywords generated by LLM 122 that are associated with the subtopic are included in an identified sentence.

Each subtopic is associated with a threshold limit of words (e.g., 600 words). Server 112 is configured to identify a top number (e.g., 10) or a top percentage (e.g., top 10%) of sentences associated with a subtopic. Server 112 is configured to select a plurality of sentences associated with a subtopic such that the word limit is not exceeded. A lower ranked sentence associated with a subtopic (e.g., #10) may be selected if a total number of words associated with the higher ranked sentences associated with the subtopic (e.g., sentences #1-9) is less than the threshold limit of words and selecting the lower ranked sentence associated with the subtopic would cause the word limit associated with the subtopic to be exceeded.

Server 112 is configured to generate a query response prompt based on the query received from client device 112 and the sentences selected for each subtopic. For example, the prompt may request LLM 122 to generate a query response based on the received query, the top 10 sentences for a first subtopic, the top 10 sentences for a second subtopic, and the top 10 sentences for a third subtopic. Server 112 is configured to provide the prompt to LLM 122. In response, LLM 122 is configured to generate a query response and provide the query response to server 112. Server 112 is configured to provide the query response to client device 102. The query response identifies and includes links to the sources associated with the selected sentences, that is, the query response identifies and includes links to the sources that were used by LLM 122 to generate the query response. As a result, a user associated with client device 102 may determine if the information provided in the response is accurate by clicking the links to the sources and reviewing the information included in a source.

Figure 2:
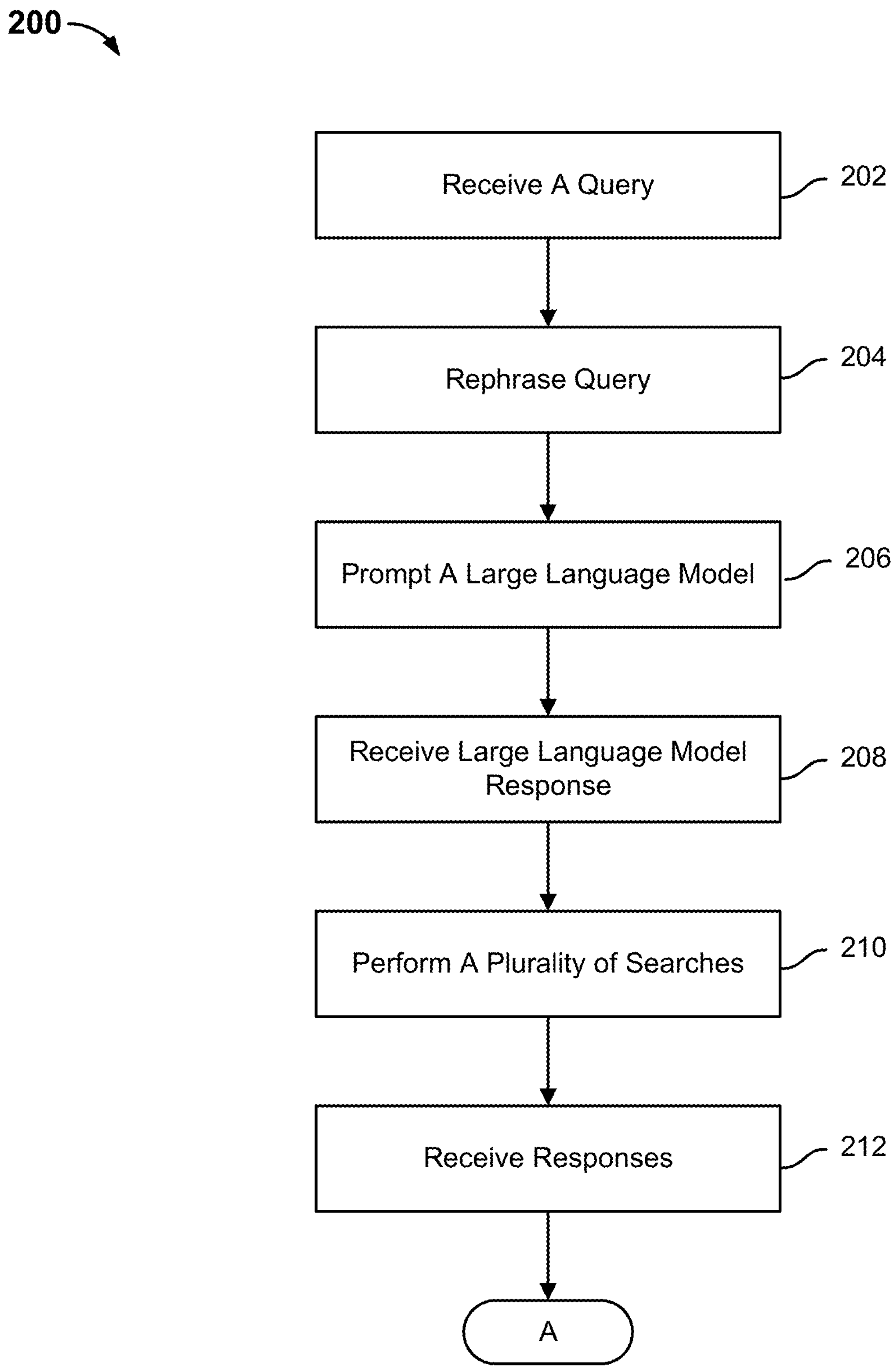
FIG. 2 is a flow diagram illustrating a process for utilizing a LLM to perform a query in accordance with some embodiments.

FIG. 2 is a flow diagram illustrating a process for utilizing a LLM to perform a query in accordance with some embodiments. In the example shown, process 200 may be performed by a server, such as server 112.

At 202, a query is received from a client device. The query is comprised of one or more words. In some embodiments, the query is comprised of one or more topic words. In some embodiments, the query is comprised of a sentence. In some embodiments, the query is comprised of a question.

At 204, the query is rephrased. The query may be rephrased to fix grammatical and/or spelling errors. The query may be rephrased to present the query in an improved format for an LLM prompt. In some embodiments, step 204 is optional.

At 206, a large language model is prompted based on the query. The prompt includes request for the LLM to generate a plurality of subtopics related to the query and a corresponding plurality of keywords for each of the plurality of subtopics. A number of subtopics related to the query may be specified by a user via the prompt. A number of keywords for each of the subtopics may be specified by the user via the prompt.

At 208, a response is received from the large language model. The LLM response includes the plurality of subtopics related to the query and a corresponding plurality of keywords for each of the plurality of subtopics. In some embodiments, duplicate instances of a keyword may be included in the LLM response. For example, a keyword may be included as a keyword for a first subtopic and a second subtopic.

In some embodiments, a keyword is deduplicated across the plurality of subtopics. For example, a keyword may be included in a response for a first subtopic and a second subtopic. A single instance of the keyword may be provided instead of providing two instances of the keyword. In such embodiments, the second instance of the keyword may be replaced with another keyword.

At 210, a plurality of searches utilizing the response received from the large language model is performed. In some embodiments, one or more search engines are utilized, in parallel, to perform some or all of the plurality of searches. In some embodiments, one or more automation web agents are utilized to perform some or all of the plurality of searches.

At 212, a plurality of responses is received. In some embodiments, a plurality of search engine responses is received from the one or more search engines. A search engine response received from a search engine may be a search result snippet or a search result preview.

In some embodiments, a plurality of web agent responses is received from the one or more automation web agents. A response received from an automation web agent may include product pricing, user reviews, historical weather data, DMV registration record, or other types of non-indexed information.

At 214, the plurality of responses is evaluated. The plurality of responses is evaluated based on the corresponding plurality of keywords. For example, a search result snippet or a search result preview is evaluated by counting a number of times a keyword included in the corresponding plurality of keywords.

The plurality of responses is filtered to generate a corresponding subset of responses for each of the subtopics based on the number of times keywords are included in a response. The responses are ranked based on the number of times keywords are included in a response. The rank of a response may be boosted based on a domain associated with the response. For example, a webpage having a ".gov" or a ".edu" domain may be boosted.

In some embodiments, the subset of responses includes a particular number of responses (e.g., the top 10 search engine responses). In some embodiments, the subset of responses includes a particular percentage of responses (e.g., the top 10% of search engine responses).

A ranking Ri of a response may be computed by:

$$Ri=((\Sigma freq(Wj))/max(\Sigma freq(Wj))+domain\_score(url)$$

where W is a keyword.

At 216, text associated with responses included in the subsets of responses is parsed. For a response included in the corresponding subsets of responses for each of the subtopics, the body of a page associated with a response (e.g., the body of a page associated with a search result) is parsed to identify sentences included in the response. The identified sentences are analyzed to determine the number of times keywords generated by the LLM that are associated with the subtopic are included in an identified sentence.

At 218, sentences included in the parsed text are ranked. Each identified sentence is associated with a corresponding subtopic. An identified sentence is ranked based on the number of times keywords generated by the LLM that are associated with the corresponding subtopic are included in the identified sentence. Identified sentences may be ranked by subtopic (e.g., sentences 1-*n* for subtopic 1, sentences 1-*n* for subtopic 2, . . . , sentences 1-*n* for subtopic n). In some embodiments, identified sentences are ranked as a group regardless of subtopic.

At 220, the large language model is prompted to generate a response to the query based on the ranked sentences and the received query. Each subtopic is associated with a threshold limit of words (e.g., 600 words). A top number (e.g., 10) or a top percentage (e.g., top 10%) of sentences associated with a subtopic are identified. A plurality of sentences associated with a subtopic is selected such that the word limit is not exceeded. A lower ranked sentence associated with a subtopic (e.g., #10) may be selected if a total number of words associated with the higher ranked sentences associated with the subtopic (e.g., sentences #1-9) is less than the threshold limit of words and selecting the lower ranked sentence associated with the subtopic would cause the word limit associated with the subtopic to be exceeded.

A query response prompt is generated based on the received query and the sentences selected for each subtopic. For example, the prompt may request the LLM to generate a query response based on the query and the sentences selected for each subtopic.

At 222, the query response is received.

At 224, a query response with links to sources used to generate the query response is provided. The query response is provided to the client device. The query response identifies and includes links to the sources associated with the selected sentences, that is, the query response identifies and includes links to the sources that were used by the LLM to generate the query response. As a result, a user associated with the client device may determine if the information provided in the response is accurate by clicking the links to the sources and reviewing the information included in a source.

Figure 3:
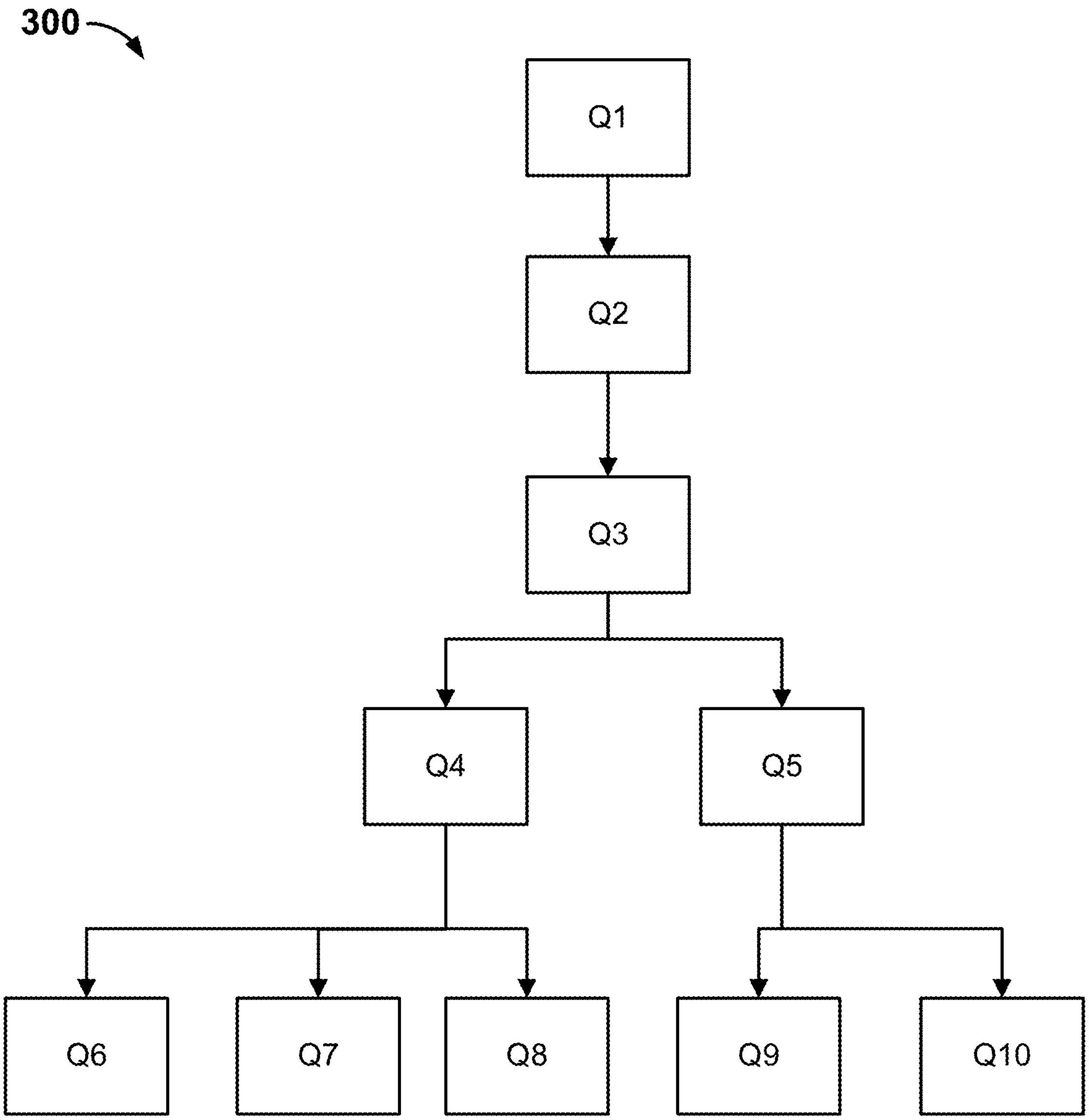
FIG. 3 is a diagram illustrating a plurality of branched query topics.

FIG. 3 is a diagram illustrating a plurality of branched query topics. In the example shown, the plurality of branched query topics 300 may be generated by a server, such as server 112 in response to a plurality of queries received from a client device, such as client device 102. An overview of the branched query topics 300 may be viewable by a user via a client device, such as client device 102.

The plurality of branched query topics 300 include query topics Q1-Q10. In some embodiments, a query topic is sequentially generated after a previous query topic (e.g., Q1→Q2→Q3). For example, a user may request a query for a second query topic be performed after receiving a response associated with a query for a first query topic. A user may provide a server a first query asking "What are the top schools in the US?" After receiving the first query response, the user may provide the server a second query asking "How much do those schools charge for tuition?"

In some embodiments, a query for a query topic is performed in parallel with another query topic (e.g., Q3→Q4, Q3→Q5). For example, a user may request a second and third query for second and third query topics, respectively, be performed after receiving a response associated with a first query where the second and third query topic are not necessarily related to each other. Continuing the above example, the user may provide the server a third query asking "Where are those schools located?" The second and third query are follow-up queries to the first query, but not necessarily related to each other independently of the first query. A separate branch of queries topics may be performed for the second and third query topics.

As seen in FIG. 3, query topics Q6, Q7, and Q8 are related to Q4, but not necessarily related to each other; query topics Q9 and Q10 are related to Q5, but necessarily to each other.

Each query topic may be stored separately in a database, such as database 142. The stored query topic includes the underlying logic associated with a query topic. For example, the underlying logic includes at least the query, the LLM prompt based on the query, the LLM prompt response (e.g., subtopics and corresponding keywords), and the LLM query response prompt.

A user may save one or more of their query topics to a query topic board. This enables the user to repeat a query or slightly modify the query for a related query topic.

The user may share their query topic board with one or more other users (e.g., via social media, via database 142, etc.). The query topic board enables one or more other users that have access to database 142 to view the query topics and the results of the query topics. A second user may copy and modify the underlying logic associated with the query topic for their particular needs. For example, the user may have a query topic associated with "What are the top things to do in San Francisco with a toddler?" The second user may copy the underlying logic and modify the underlying logic for the LLM prompt based on the query such that the LLM returns 4 subtopics instead of 3 and generates 30 keywords for each subtopic instead of 15 keywords.

Figure 4:
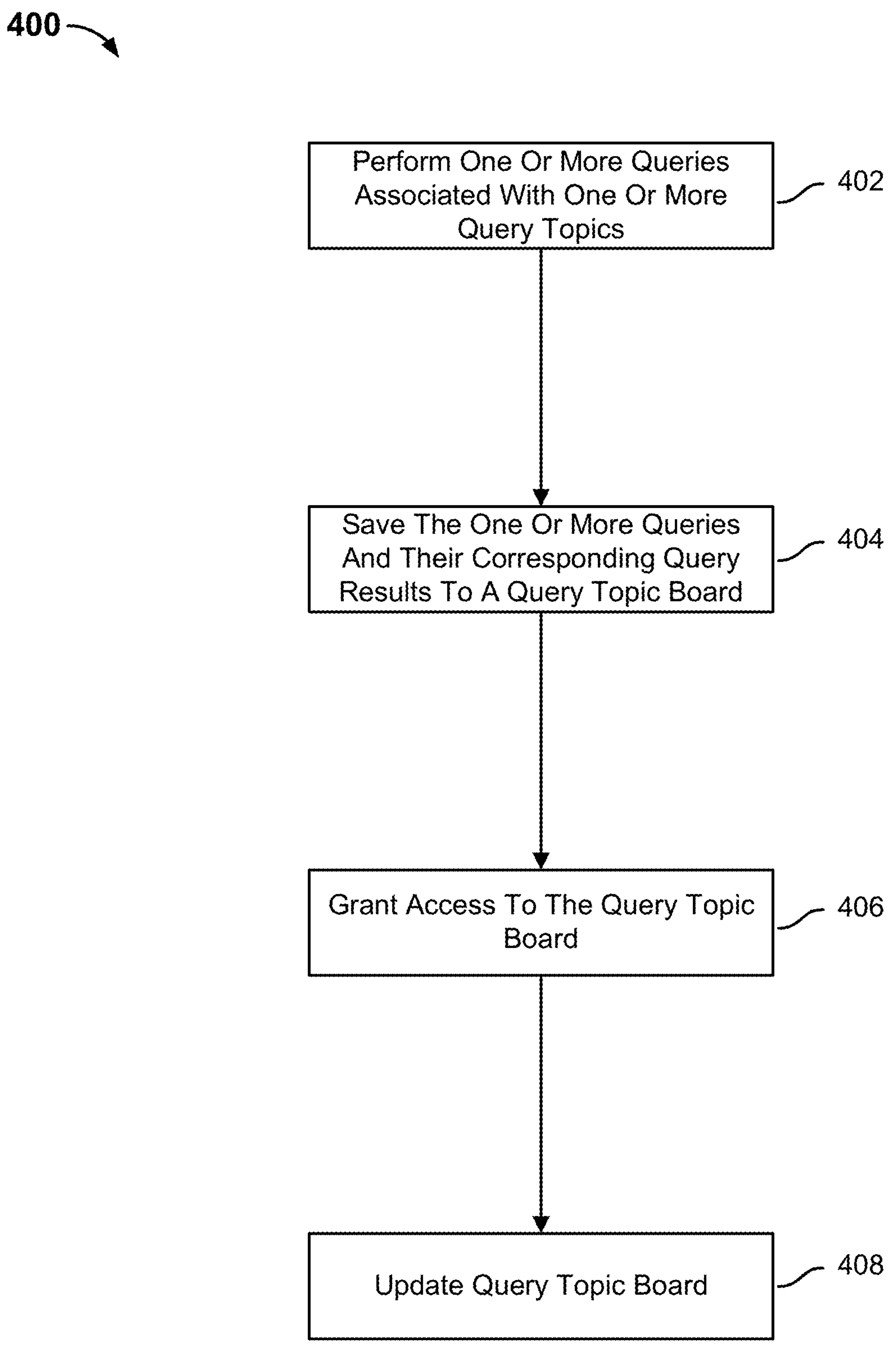
FIG. 4 is a flow diagram illustrating a process for maintaining a query topic board in accordance with some embodiments.

FIG. 4 is a flow diagram illustrating a process for maintaining a query topic board in accordance with some embodiments. In the example shown, process 400 may be implemented by a server, such as server 112.

At 402, one or more queries associated with one or more query topics are performed.

At 404, the one or more queries and their corresponding query results are saved to a query topic board.

At 406, access to the query topic board is granted. A creator user of the query topic board may be given read/write access. A non-creator user may be given read access.

At 408, the query topic board is updated. A query result associated with a query may change over time. For example, a query may be "How much does it cost to buy Good X?" The price of Good X is subject to various market conditions, such as supply and demand, time of year, etc. The query response stored by the query topic board may be updated even though the creator user did not repeat the query. In some embodiments, the server repeats a query stored by a query topic board according to a schedule (e.g., daily, weekly, monthly, etc.). In some embodiments, the server repeats a query stored by the query topic board in response to the creator user repeating the query or in response to a non-creator user performing the query.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving from a client device a query;

providing to a large language model a prompt to generate a plurality of subtopics on the query and to generate a corresponding plurality of keywords for each of the plurality of subtopics;

utilizing one or more search engines to perform a plurality of searches utilizing the plurality of subtopics and the corresponding plurality of keywords received from the large language model;

receiving from the one or more search engines a plurality of responses corresponding to the plurality of subtopics and the corresponding plurality of keywords;

evaluating the plurality of responses based on the corresponding plurality of keywords;

providing to the large language model the received query and a corresponding subset of sentences associated with each of the plurality of subtopics, wherein the corresponding subset of sentences are selected from a subset of the plurality of responses;

receiving a query response from the large language model that is generated based on the received query and the corresponding subset of sentences associated with each of the plurality of subtopics; and providing to the client device the query response that includes a plurality of links to sources that were used by the large language model to generate the large language model query response.

2. The method of claim 1, further comprising rephrasing the query.

3. The method of claim 2, wherein the query is rephrased to fix grammatical and/or spelling errors.

4. The method of claim 2, wherein the query is rephrased to present the query in an improved format for the large language model prompt.

5. The method of claim 1, wherein a prompt to generate the plurality of subtopics on the query includes a corresponding number of the subtopics and a corresponding number of the keywords for each of the plurality of subtopics.

6. The method of claim 1, further comprising receiving from the large language model the plurality of subtopics and the corresponding plurality of keywords for each of the plurality of subtopics.

7. The method of claim 1, wherein evaluating the plurality of responses includes counting, for each response included in the plurality of responses, a number of times the corresponding plurality of keywords appears in the plurality of responses.

8. The method of claim 7, wherein the plurality of responses includes a plurality of search result snippets.

9. The method of claim 7, wherein evaluating the plurality of responses includes ranking the plurality of responses.

10. The method of claim 9, wherein the plurality of responses is ranked based on the number of times the corresponding plurality of keywords appears in a corresponding response.

11. The method of claim 9, wherein the plurality of responses is ranked based on a corresponding domain associated with the plurality of responses.

12. The method of claim 9, wherein evaluating the plurality of responses includes generating a corresponding subset of responses for each of the plurality of subtopics based on the plurality of ranked responses.

13. The method of claim 12, wherein a top number or a top percentage of the ranked responses is included in the corresponding subset of responses.

14. The method of claim 12, further comprising parsing text included in pages linked to the corresponding subset of responses.

15. The method of claim 14, further comprising ranking sentences included in the parsed texted included in the pages linked to the corresponding subset of responses based on the number of times the corresponding plurality of keywords appears in the sentences.

16. The method of claim 15, wherein each of the plurality of subtopics is associated with a corresponding subset of sentences that are selected from the ranked sentences.

17. The method of claim 16, wherein each of the plurality of subtopics is associated with a word limit.

18. The method of claim 1, further comprising utilizing one or more web agents to parse text associated with one or more online sources.

19. The method of claim 18, wherein at least one of the one or more web agents utilizes login credentials associated with a user of the client device to access the one of the one or more online sources.

20. The method of claim 1, further comprising:

receiving from the client device one or more subsequent queries related to the query; and storing the query and the one or more subsequent queries related to the query as a branched query topic.

21. The method of claim 20, further comprising providing access to the branched query topic via a query topic board.

22. A system, comprising:

a processor configured to:

receive from a client device a query;

provide to a large language model a prompt to generate a plurality of subtopics on the query and to generate a corresponding plurality of keywords for each of the plurality of subtopics;

utilize one or more search engines to perform a plurality of searches utilizing the plurality of subtopics and the corresponding plurality of keywords received from the large language model;

receive from the one or more search engines a plurality of responses corresponding to the plurality of subtopics and the corresponding plurality of keywords;

evaluate the plurality of responses based on the corresponding plurality of keywords;

provide to the large language model the received query and a corresponding subset of sentences associated with each of the plurality of subtopics, wherein the corresponding subset of sentences are selected from a subset of the plurality of responses;

receive a query response from the large language model that is generated based on the received query and the corresponding subset of sentences associated with each of the plurality of subtopics; and provide to the client device the query response that includes a plurality of links to sources that were used by the large language model to generate the large language model query response; and a memory coupled to the processor and configured to provide the processor with instructions.

23. A computer program product embodied in a non-transitory computer readable medium and comprising computer instructions for:

receiving from a client device a query;

providing to a large language model a prompt to generate a plurality of subtopics on the query and to generate a corresponding plurality of keywords for each of the plurality of subtopics;

utilizing one or more search engines to perform a plurality of searches utilizing the plurality of subtopics and the corresponding plurality of keywords received from the large language model;

receiving from the one or more search engines a plurality of responses corresponding to the plurality of subtopics and the corresponding plurality of keywords;

evaluating the plurality of responses based on the corresponding plurality of keywords;

providing to the large language model the received query and a corresponding subset of sentences associated with each of the plurality of subtopics, wherein the corresponding subset of sentences are selected from a subset of the plurality of responses;

receiving a query response from the large language model that is generated based on the received query and the corresponding subset of sentences associated with each of the plurality of subtopics; and providing to the client device the query response that includes a plurality of links to sources that were used by the large language model to generate the large language model query response.

* * * * *